United States Patent [19]

Tsurumaki

[11] Patent Number: 5,477,533
[45] Date of Patent: Dec. 19, 1995

[54] BURST TRANSFER DEVICE AND BURST TRANSFER SYSTEM

[75] Inventor: Shinzo Tsurumaki, Kawasaki, Japan

[73] Assignee: Fujitsu Limited, Kanagawa, Japan

[21] Appl. No.: 288,275

[22] Filed: Aug. 8, 1994

[30] Foreign Application Priority Data

Jan. 13, 1994 [JP] Japan .................................. 6-002214

[51] Int. Cl.⁶ ...................................................... H04L 5/14
[52] U.S. Cl. ............................ 370/29; 370/110.1; 370/68.1
[58] Field of Search ................................. 370/24, 29, 30,
370/31, 95.1, 95.3, 58.1, 58.2, 58.3, 60,
60.1, 110.1, 68.1

[56] References Cited

U.S. PATENT DOCUMENTS

| | | | |
|---|---|---|---|
| 4,635,247 | 1/1987 | Tejima | 370/95.3 |
| 4,715,033 | 12/1987 | Saburi | 370/95.3 |
| 4,970,506 | 11/1990 | Sakaida et al. | 370/29 |
| 5,046,063 | 9/1991 | LaGess | 370/29 |

FOREIGN PATENT DOCUMENTS

| | | |
|---|---|---|
| 0062922 | 10/1982 | European Pat. Off. . |
| 0069970 | 1/1983 | European Pat. Off. . |
| 57-135558 | 8/1982 | Japan . |
| 63-193636 | 8/1988 | Japan . |

*Primary Examiner*—Wellington Chin

[57] ABSTRACT

A burst transfer device, connected to a transmission line, sends a data burst of a frame structure including transmission information and redundant information. A memory unit temporarily stores transmission information. A redundant information adding unit adds redundant information to the transmission information. A control unit receives the transmission information from the memory means and the redundant information from the redundant information adding unit, and produces m data sub-bursts (m is an integer) obtained by dividing a data burst having the frame structure into m. The m data sub-bursts are output to the transmission line.

12 Claims, 18 Drawing Sheets

POSITION
INFORMATION
MEMORY

REPRODUCTION
INFORMATION
MEMORY

BURST TRANSFER DEVICE AND BURST TRANSFER SYSTEM

BACKGROUND OF THE INVENTION

1. Field of the Invention

The present invention generally relates to data communications in which digital information is transferred in a burst formation, and more particularly to a multiplexed transfer system in which 1:1 or 1:n communications take place in the burst formation.

Conventionally, a two-wire cable is used as a transmission path or line connecting an exchange and a subscriber terminal. As transfer methods using such a two-wire cable, a two-wire time division transfer method, a two-wire hybrid transfer method and a two-wire frequency division transfer method are known. The two-wire time division transfer method is advantageous to the other two transfer methods in terms of the system configuration and the transmission rate, and is most attractive at present.

The two-wire time division transfer method is based on a 1:1 transmission. Recently, a two-wire time division transfer method based on a 1:n transmission has been proposed. In such transfers, it is necessary to temporarily store information to be transmitted in a buffer in order to assemble burst signals therefrom. In this case, a delay of transmission occurring in the above burst process is a problem to be solved.

FIG. 1 is a block diagram of a burst transfer system realizing a 1:1 transmission. Terminal equipments such as analog telephone sets and ISDN (Integrated Services Digital Network) terminals are accommodated in an exchange office via line termination equipments (which are also referred to as network termination equipments) 10 and transmission lines L. The transmission lines L are formed with coaxial cables or optical fiber cables. The exchange office includes an exchange 12, an in-office line termination equipment 14 and an operation/setting device 16. The in-office line termination equipment 14 accommodates the transmission lines L connected to the network termination equipments 10, and has the function of data multiplexing and demultiplexing. The operation/setting device 16 sets information that defines the operations of the in-office line termination equipment 14. The exchange 12 performs a data exchange. In FIG. 1, the network termination equipments 10 are represented as symbol ONU, and the in-office line termination equipment 14 is represented as symbol SLT for the sake of convenience.

FIG. 2 is a timing chart of the operation of the burst transfer system shown in FIG. 1. The operation shown in FIG. 2 is so-called ping-pong transfer. Each transmission line L is used in time division formation, and a data transfer from the exchange office to the terminal equipment and a data transfer from the terminal equipment to the exchange office are alternately very constant period T. In FIGS. 1 and 2, the direction from the exchange office to the terminal equipments is defined as a "down" direction, and a data burst transferred in the down direction is referred to as a down data burst. Also, the direction from the terminal equipments to the exchange office is defined as an "up" direction, and a data burst transferred in the up direction is referred to as an up data burst. FIG. 2 shows an operation that transmission information sent by the exchange office is sent to the corresponding transmission line L as down data bursts.

FIG. 3 shows a block diagram of a burst transfer system realizing a 1:n transmission. In FIG. 3, parts that are the same as those shown in FIG. 1 are given the same reference numbers.

As shown in FIG. 3, a branch device 18 is provided in the transmission line L. The branch device 18 branches one transmission line L to a plurality of transmission lines. By providing the branch device 18, the exchange office can view terminal equipments as if these terminal equipments are connected to one transmission line L (that is, network termination equipments). With the above structure, it becomes possible to efficiently use the transmission line L and accommodate a large number of terminal equipments.

FIG. 4 is a timing chart of the operation of the burst transfer system shown in FIG. 3. More particularly, FIG. 4 shows the operation of one transmission line to which n terminal equipments are connected via the branch device 18. The down data bursts from the exchange office are transferred in a broadcasting manner. Each of the down data bursts includes down data sequences 1 through n to be respectively sent to the n terminal equipments. Each of the down data sequences 1 through n are consecutive data. The n terminal equipments output n up data bursts to the corresponding transmission lines L at respective timings which are determined in a manner described later. Transferring of one down data burst and subsequent transferring of n data bursts are alternately performed every constant period T. The amount of information transferable during the constant period T by the 1:1 transmission is equal to that transferable by the 1:n transmission.

FIG. 5A shows a frame structure of down data bursts used in the 1:n transmission, and FIG. 5B shows a frame structure of up data bursts used in the 1:n transmission.

One frame of the down data burst shown in FIG. 5A is equal to a period Td (<T), and includes a preamble pattern PR, a framing (frame synchronizing) pattern FR, overhead information OH and information Di (i=1, 2, ..., n) arranged in this order. The preamble pattern PR, the framing pattern FR and the overhead information OH forms a redundant part (header part). The preamble pattern PR is pattern data for reproducing received data and a clock signal. The framing pattern FR is pattern data for detecting the constant period T. The overhead information is information indicating the state of use of the information area in a frame storing items D1 through Dn of information. The items D1 through Dn of information are items of information respectively sent to the terminal equipments from the exchange office.

One frame of the down data burst shown in FIG. 5B is equal to a period Tu (<T), and includes a preamble pattern PR, a framing pattern FR, overhead information OH and information D arranged in this order. The framing pattern FR in the up data burst is a pattern indicating the beginning of the burst.

Each of the network termination equipments 10 shown in FIG. 3 reproduces the clock signal from the preamble pattern PR of the data burst transferred via the transmission line L, and detects the framing pattern. When a predetermined timing synchronized with the reproduced clock signal is obtained, each of the network termination equipments 10 starts to send a data burst as shown in FIG. 5B. The in-office line termination equipment 14 shown in FIG. 3 receives data bursts from the n terminal equipments, and reproduces clock signals from the preamble patterns PR of the received data bursts. Then, the in-office line termination equipment 14 receives the subsequent framing pattern FR and information.

FIG. 6 is a diagram of a circuit configuration which is related to formation of burst data, and is provided in each of the transmission lines L connected to the network termination equipments 10 and the in-office line termination equipment 14. Hereinafter, the circuit configuration shown in FIG.

6 is referred to as a burst circuit. The burst circuit shown in FIG. 6 is made up of two T-time data memory circuits 20 and 22, two switches 24 (SW1) and 26 (SW2), a burst formation circuit 28, a T-time generating circuit 30, a redundant part circuit 32 and an inverter 34.

The following description of the burst circuit is related to a case where it is connected to one transmission line L connected to the in-office line termination circuit 14. Transmission information from the exchange 12 shown in FIG. 3 is sent to either the data memory circuit 20 or the data memory circuit 22 by means of the switch 24. Assuming now that the switch 24 selects the data memory circuit 20, the above transmission information (which corresponds to the items D1 through Dn of information shown in FIG. 5A) addressed to the terminal equipments is written into the data memory 20. During this time, the switch 26 selects the data memory circuit 22, and the previously written transmission information is read therefrom. The control of the switches 24 and 26 is performed according to a timing signal output by the T-time generating circuit 30. This timing signal is applied directly to the switch 26, and is applied via the inverter 34 to the switch 24. The switches 24 and 26 are switched every T time so that data is written into one of the data memory circuits 20 and 22 and data is read from the other data memory circuit.

The burst formation circuit 28 receives the timing signal output by the T-time generating circuit 30, and then adds the redundant part to the transmission information received via the switch 26. As has been described previously, the redundant part includes the preamble pattern PR, the framing pattern FR and the overhead information OH. The data bus thus generated is output to the transmission line L in the frame format shown in FIG. 5.

The configuration shown in FIG. 6 provided in each of the network termination equipments 10 operates in the same manner as described above. In this case, the switch 24 receives transmission information from the corresponding terminal equipment.

However, in any of the above-mentioned 1:1 transfer and 1:n transfer, it is necessary to store information during the constant period T and send it to the transmission line L during the next constant period T. Hence, a delay of the period T occurs in the above process, and information is transferred with a delay of time.

SUMMARY OF THE INVENTION

It is a general object of the present invention to provide a burst transfer device and system in which the above disadvantage is eliminated.

A more specific object of the present invention is to provide a burst transfer device and system capable of forming burst data with a reduced delay of time and reducing a delay in transferring information.

The above objects of the present invention are achieved by a burst transfer device connected to a transmission line, the burst transfer device sending a data burst of a frame structure including transmission information and redundant information, the burst transfer device comprising:

memory means for temporarily storing transmission information;

redundant information adding means for adding redundant information to the transmission information; and control means for receiving the transmission information from the memory means and the redundant information from the redundant information adding means and for producing m data sub-bursts (m is an integer) obtained by dividing a data burst having the frame structure into m, the m data sub-bursts being output to the transmission line.

Another object of the present invention is to provide a data transfer system using a data transfer device as described above.

This object of the present invention is achieved by a burst transfer system comprising:

an exchange office;

a plurality of terminals;

first termination equipments provided in transmission lines connected to the plurality of terminals; and a second termination equipment provided in the exchange office and connected to the plurality of terminals, a data burst of a frame structure including transmission information and redundant information containing being transferred in the burst transfer system, each of the first and second termination equipments comprising:

memory means for temporarily storing transmission information;

redundant information adding means for adding redundant information to the transmission information; and control means for receiving the transmission information from the memory means and the redundant information from the redundant information adding means and for producing m data sub-bursts (m is an integer) obtained by dividing a data burst having the frame structure into m, the m data sub-bursts being output to the transmission line.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

A description will now be given of embodiments of the present invention.

Figure 7:
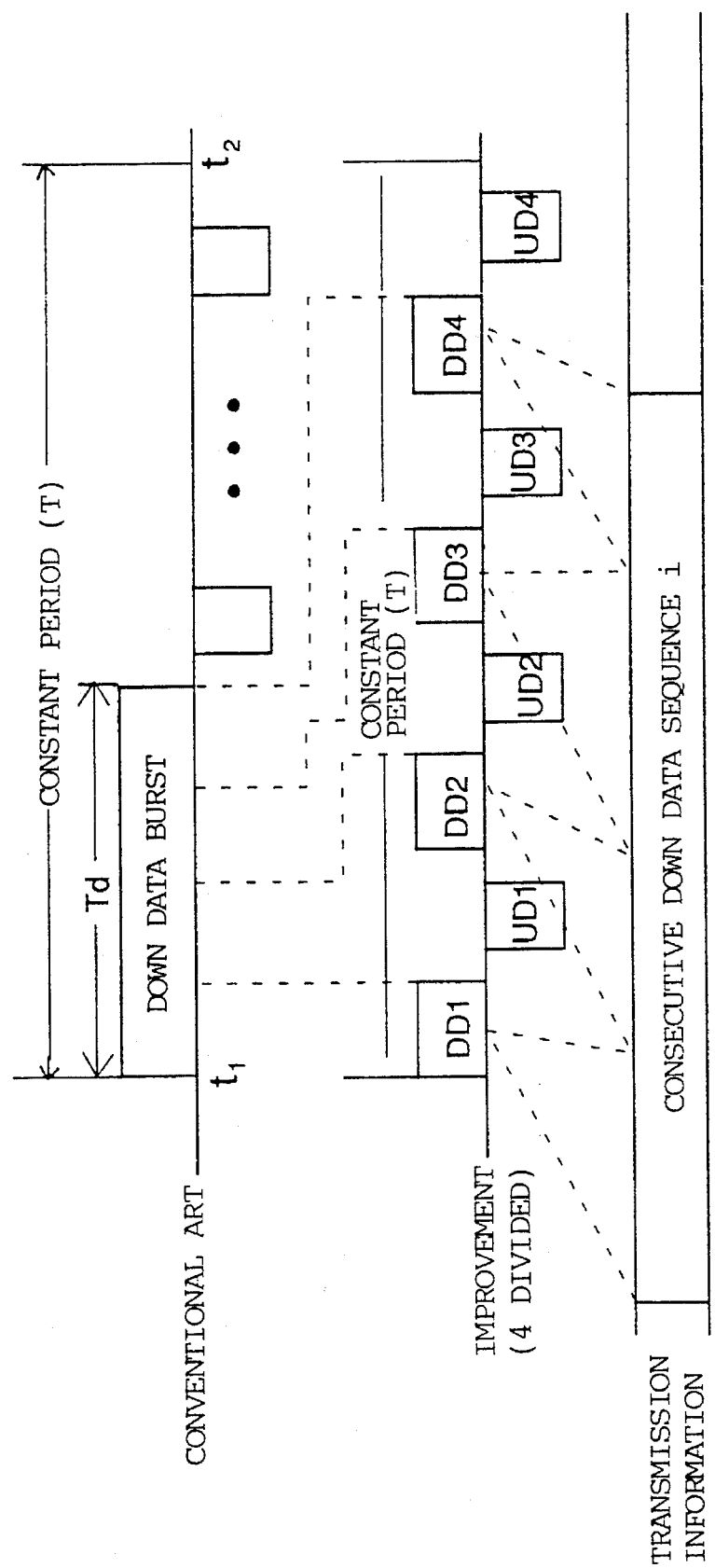
FIG. 7 is a timing chart showing the principle and the operation of a first embodiment of the present invention.

FIG. 7 is a timing chart showing a first embodiment of the present invention in comparison with the conventional art. In order to facilitate understanding of the first embodiment of the present invention, a description will now be given, with reference to FIG. 7, of how a data burst of one frame is divided into data sub-bursts according to the first embodiment of the present invention, and then the block structure of the first embodiment thereof will be described.

Figure 3:
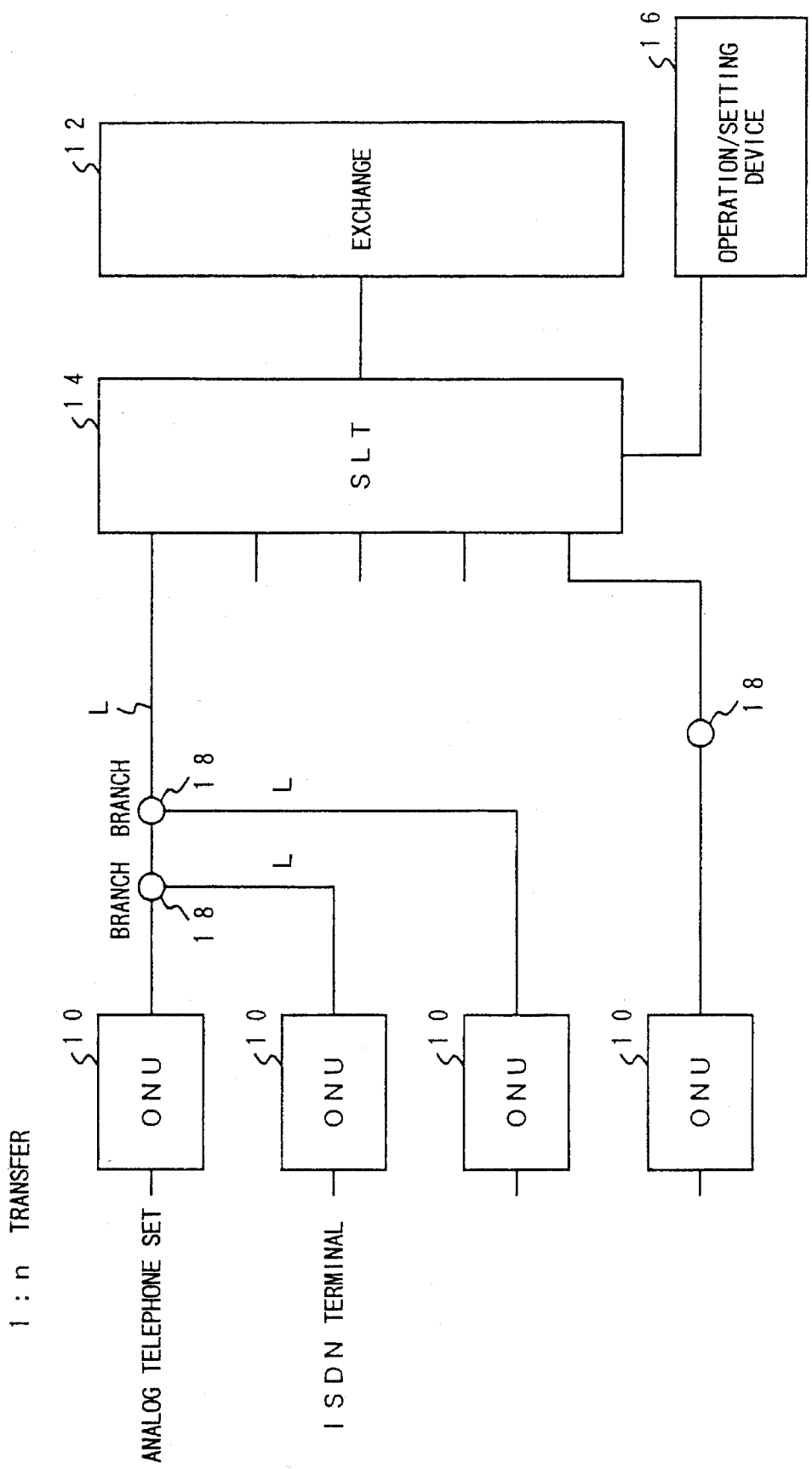
FIG. 3 is a block diagram of a burst transfer system of a 1:n transfer system.
Figure 4:
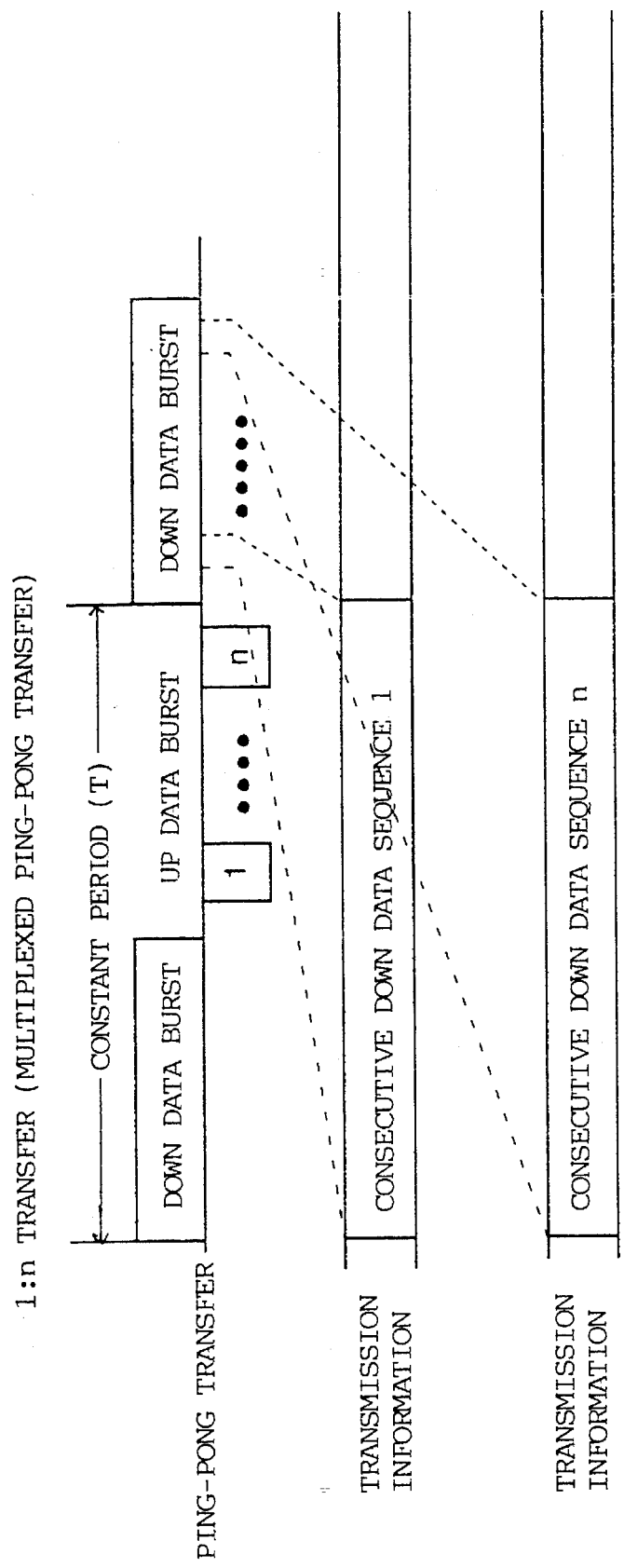
FIG. 4 is a timing chart of the operation of the burst transfer system shown in FIG. 2.
Figure 5A:
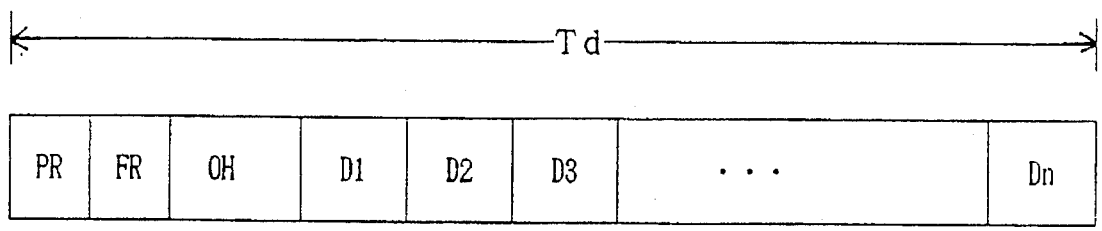
FIGS. 5A and 5B are diagrams of frame formats used in the burst transfer system shown in FIG. 3.
Figure 5B:
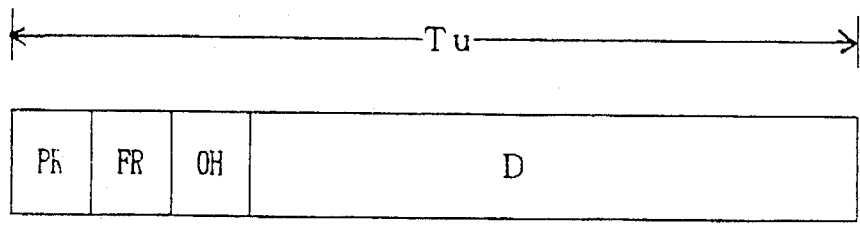
Figure 6:
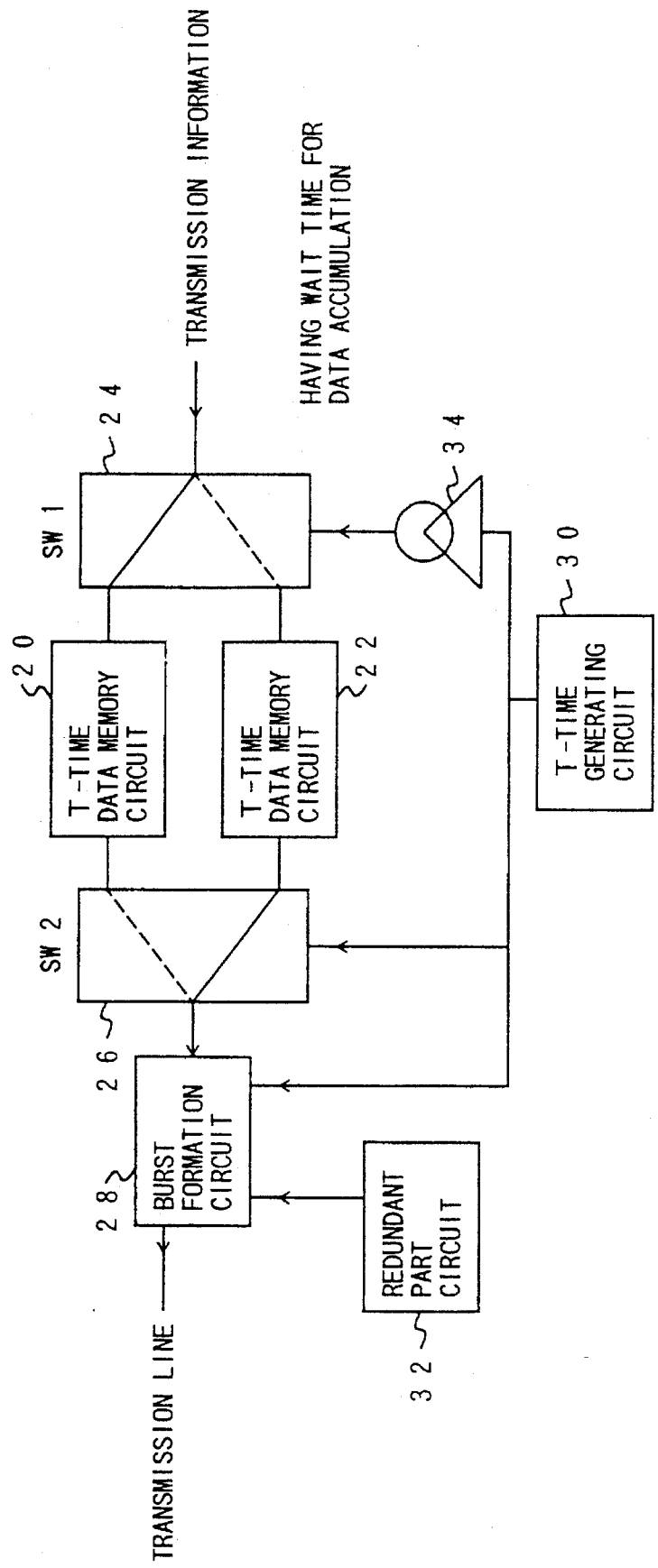
FIG. 6 is a block diagram of a conventional burst circuit.

More particularly, FIG. 7 shows a data transfer in the down direction (from the exchange office to the terminal equipment) in a burst transfer system realizing the 1:n transfer as shown in FIG. 3. According to the conventional art, transmission information (consecutive down data sequences) addressed to a terminal equipment is sent, as data burst, to the transmission line in the period (starting from time $t_2$ shown in FIG. 7) next to the period T (starting from time $t_1$) shown in FIG. 7.

On the other hand, according to the first embodiment of the present invention, the down data burst (which was transferred within the constant period T in the conventional art) is equally divided into a plurality of data sub-bursts DD1 through DD4 (four data sub-bursts in the example shown in FIG. 7) starting from the beginning of the above down data burst. These data sub-bursts are transferred in the same constant period as that shown in FIG. 7. The data sub-bursts DD1 through DD4 corresponding to the transmission information addressed to a terminal equipment are distributed in the period T. Up data bursts UD1 through UD4 are transferred during intervals between the data sub-bursts DD1 through DD4. In the example shown in FIG. 7, the up data bursts are not divided. However, as will be described later, each up data burst may be divided into data sub-bursts in addition to the burst formation for the down data bursts.

In the example shown in FIG. 7, the down data burst within the constant period T is divided into four data sub-bursts. Hence, only the first (beginning) sub-burst includes redundant information. Therefore, as shown in FIG. 7, the quantity of information transferable by the first data sub-burst DD1 is less than that transferably by the other data sub-bursts DD2, DD3 and DD4. Further, according to the first embodiment of the present invention, it takes a delay time equal to T/4 to produce four data sub-bursts DD1 through DD4 from the down data burst, and hence data transfers can be performed more rapidly than those in the conventional art. Further, the capacity of the memory which temporarily stores information can be reduced to 1/m in terms of the principle of the first embodiment of the present invention.

Figure 8A:
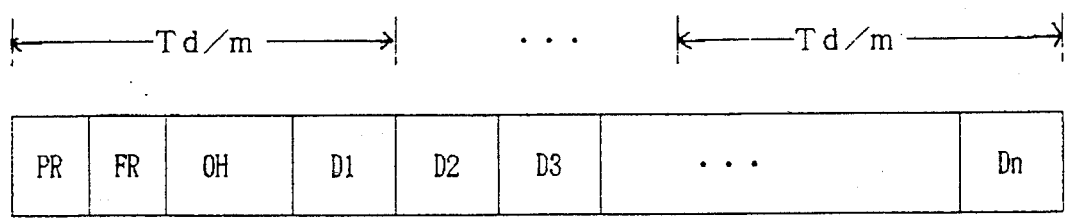
FIGS. 8A and 8B are diagrams of frame formats used in the first embodiment of the present invention.
Figure 8B:
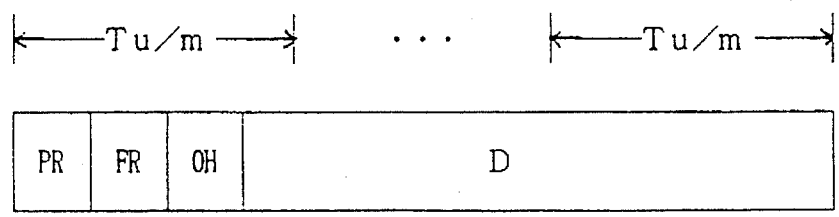

FIG. 8A shows a format of a down-direction data burst equal to one frame according to the first embodiment of the present invention. FIG. 8B shows a format of an up-direction data burst equal to one frame according to the first embodiment of the present invention. As shown in FIG. 8A, the down data burst equal to one frame is divided into m data sub-bursts, each of which sub-bursts has a length Td/m (Td denotes the data length of the down data burst in the constant period T). Only the first data burst includes redundant information, namely the preamble pattern PR, the framing pattern FR and the overhead information OH. The other data sub-bursts includes only transmission information. As will be described later, the data sub-bursts including only transmission information are received and reproduced by detecting the redundant information included in the first data sub-burst and holding it.

As shown in FIG. 8B, the up data burst equal to one frame is divided into m. When the data length of one data burst is denoted as Tu, one data sub-burst has a data length equal to Tu/m. Only the first data sub-burst includes redundant information, namely the preamble pattern PR, the framing pattern FR and the overhead information OH. The other data sub-bursts includes only transmission information. For example, in the 1:1 transfer method, a terminal equipment sends the m data sub-bursts to the exchange office, which detects the redundant information from the first data sub-burst and reads and reproduces the subsequent data sub-bursts.

Figure 1:
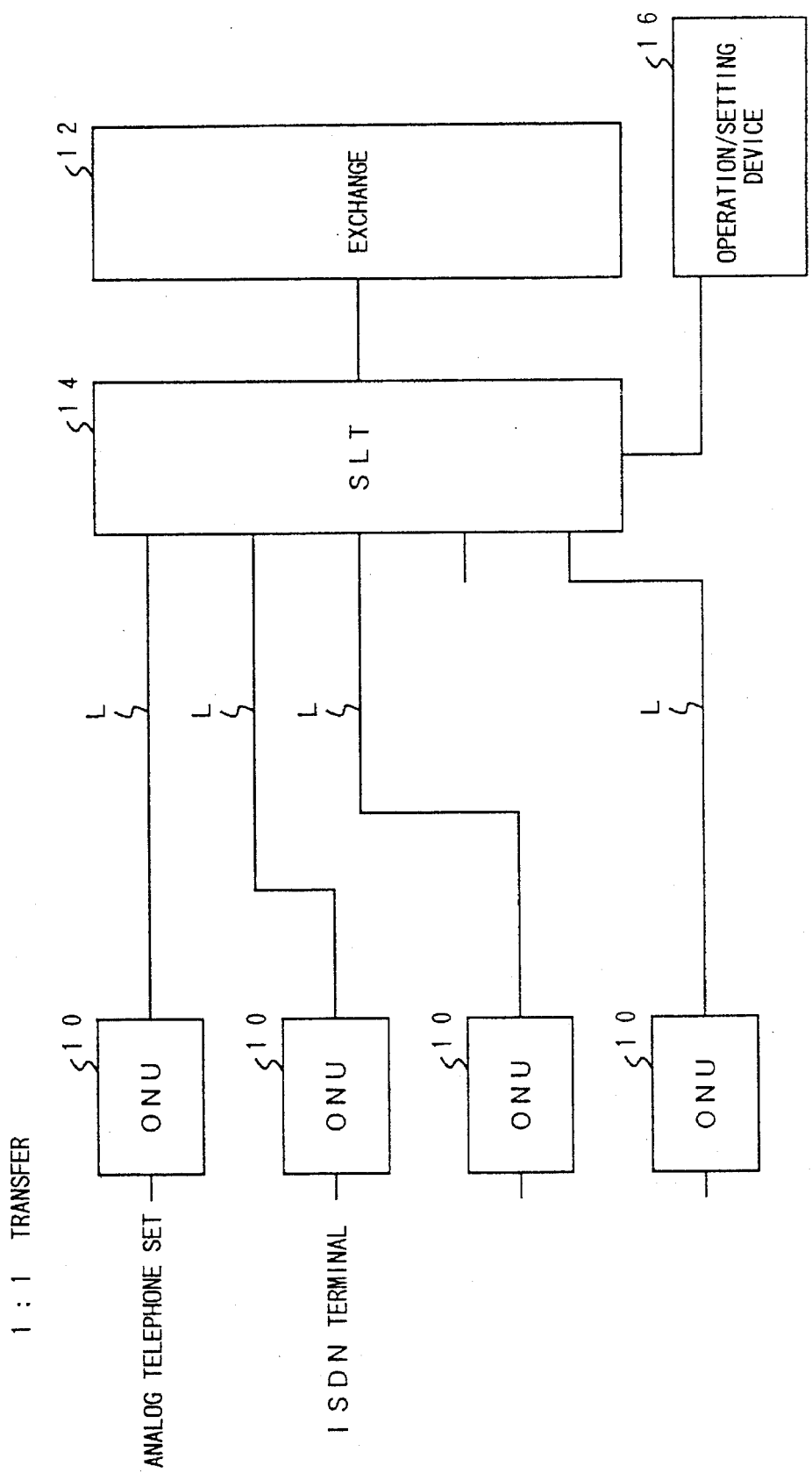
FIG. 1 is a block diagram of a burst transfer system of a 1:1 transfer system.
Figure 2:
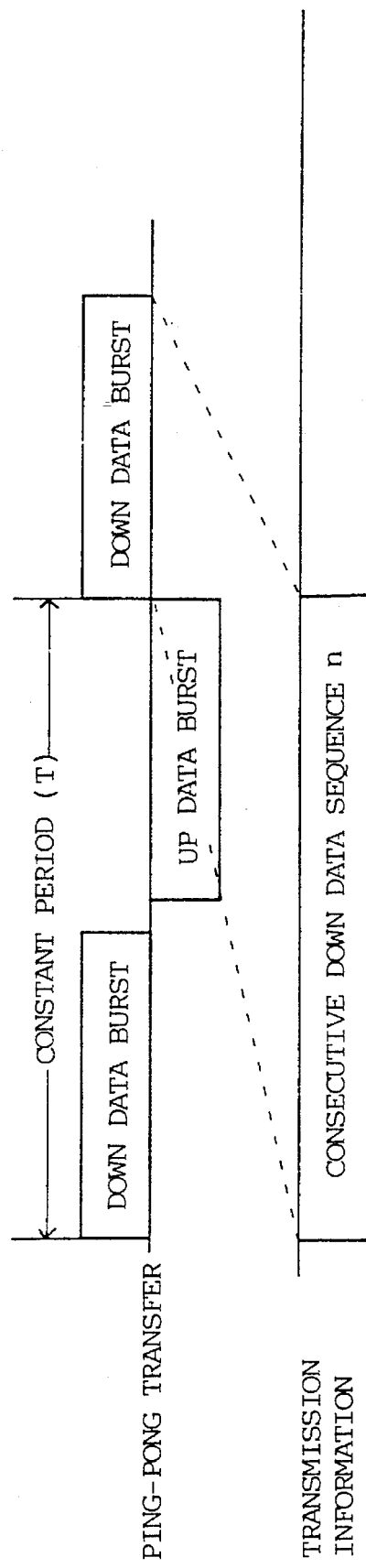
FIG. 2 is a timing chart of the operation of the burst transfer system shown in FIG. 1.
Figure 9:
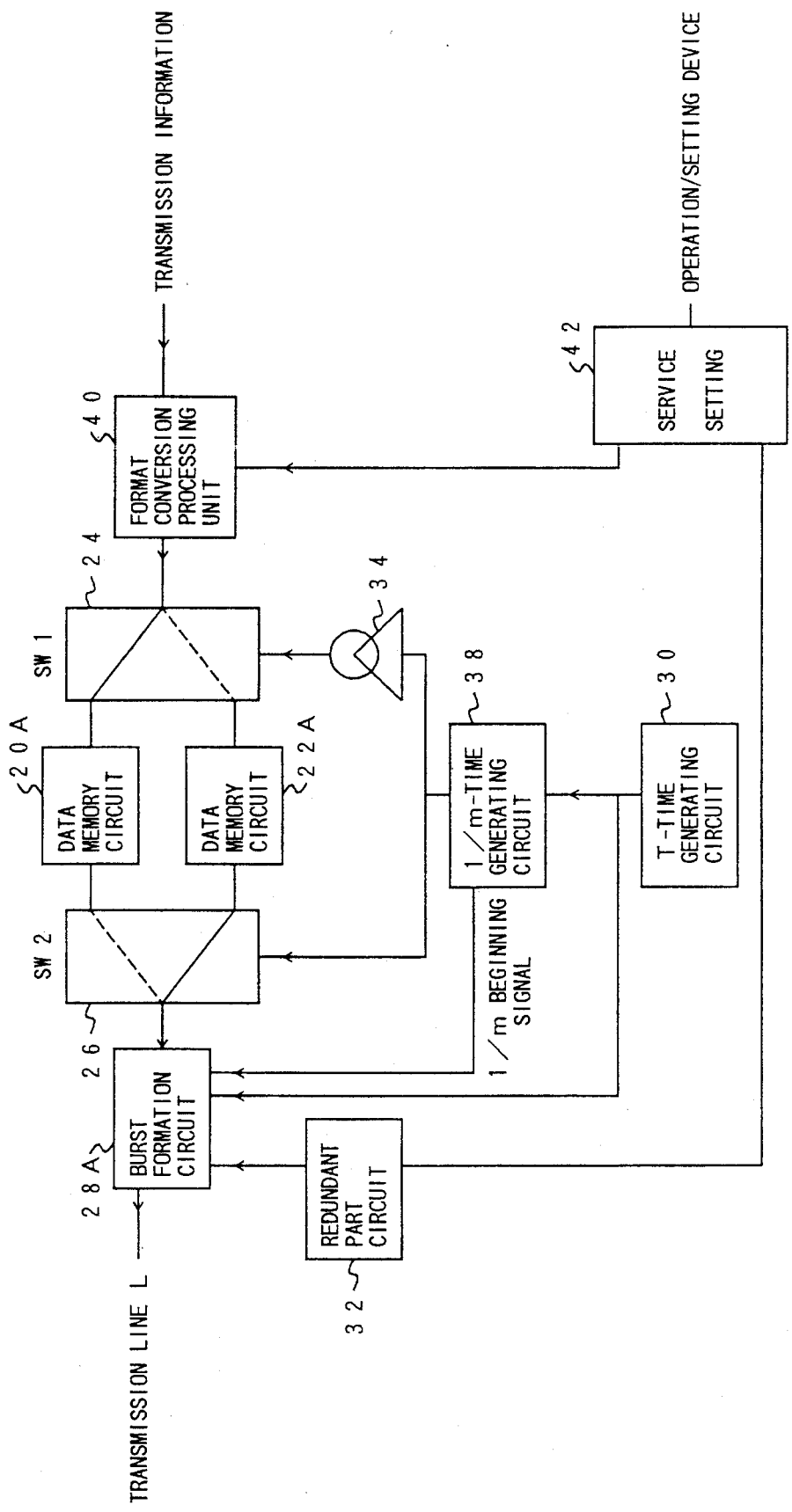
FIG. 9 is a block diagram of the structure of the first embodiment of the present invention.

FIG. 9 is a block diagram of the structure of the first embodiment of the present invention. More particularly, FIG. 9 shows a circuit configuration (burst circuit) related to the formation of burst data, the above circuit configuration being provided in each transmission line L in each of the network termination equipments 10 and the in-office line termination equipment 14 shown in FIGS. 1 and 3. In FIG. 9, parts that are the same as those shown in the previously described figures are given the same reference numerals as previously. The burst circuit shown in FIG. 9 includes two data memory circuits 20A and 22A, two switches 24 (SW1) and 26 (SW2), a burst formation circuit 28A, the T-time generating circuit 30, the redundant part circuit 32, the inverter 34, a 1/m-time generating circuit 38, a format conversion processing unit 40 and a service setting unit 42.

The 1/m-time generating circuit 38 receives the timing signal generated by the T-time generating circuit 30 every period T, and outputs a timing signal (1/m beginning signal) to the switch 26 and the inverter 34 every period T/m. Also, the timing signal generated by the 1/m-time generating circuit 38 is output to the burst formation circuit 28A. The burst formation circuit 28A knows the beginning of the constant period T when simultaneously receiving the timing signal output by the T-time generating circuit 30 and the timing signal generated by the 1/m-time generating circuit 38. AT this time, the redundant signal from the redundant part circuit 32 is output to the transmission line L. The 1/m-time generating circuit 38 may be designed to output the 1/m beginning signal every period T in synchronism with the beginning of the constant period T.

The format conversion processing unit 40 receives the transmission information from, for example, the exchange 12 (FIGS. 1 and 3), and converts the format of the transmission information which can be processed by the exchange 12 into a format transferable. Parameter information defining the above format conversion can arbitrarily set within a predetermined range via the service setting unit 42. The transmission information in the converted format is output to the switch 24. The service setting unit 42 performs setting of the parameter information defining the format conversion and setting of redundant information.

A description will now be given of the operation of the structure shown in FIG. 9.

The format conversion processing unit 40 receives the transmission information and performs the format conversion process for the received information. The transmission information arranged in the converted format is output to the switch 24. It will now be assumed that the switch 24 connects the format conversion processing unit 40 and the data memory circuit 20A together and the switch 26 connects the burst formation circuit 28A and the data memory circuit 22A together. The transmission information from the format conversion processing unit 40 is written into the data memory circuit 20A via the switch 24. At this time, the previously written transmission information is read from the data memory circuit 22A and is output to the burst formation circuit 28A.

It will now be assumed that the switch 26 is switched and the timing signal from the T-time generating circuit 30 and the 1/m beginning signal from the 1/m-time generating circuit 38 are simultaneously output at the time of outputting the transmission information from the data memory circuit 22A to the burst formation circuit 28A. In this case, the burst formation circuit 28A sends the redundant information output by the redundant part circuit 32 to the transmission line L, and then outputs the transmission information form the data memory circuit 22A to the transmission line L. In the format shown in FIG. 8A, after the PR, FR and OH are sent, transmission information D1 is output to the transmission line L. During the above operation, the transmission information D2, D3, . . . shown in FIG. 8A is written into the data memory circuit 20A.

After the t/m time elapses, the 1/m-time generating circuit 38 outputs the timing signal, so that the switches 24 and 26 are switched . Hence, the transmission information from the format conversion processing unit 40 is written into the data memory circuit 22A via the switch 24. Further, the transmission information written into the data memory circuit 20A is read therefrom and is output to the burst formation circuit 28A via the switch 26. In the case shown in FIG. 8A, the burst formation circuit 28A receives the transmission information D2, D3, . . . , and outputs the received information to the transmission line L1 without modification. At this time, the redundant information is not output.

In the above-mentioned manner, m data sub-bursts are produced per frame and are output to the transmission line L. When the time T elapses, the T-time generating circuit 30 outputs the timing signal, and simultaneously the 1/m-time generating circuit 38 outputs the 1/m beginning signal. Hence, the burst formation circuit 28A can know the beginning of the next period T, and outputs the redundant information from the redundant part circuit 32 to the transmission line L.

The explanation of the first embodiment of the present invention has just been completed. The structure shown in FIG. 9 can be applied to burst data transfers in the up and down directions in each of the network termination equipments 10 and the in-office line termination unit 14 shown in FIGS. 1 and 3. The format conversion unit 40 and the service setting unit 42 themselves are used in the conventional burst transfer systems, and hence a detailed description thereof will be omitted here (for the sake of convenience, these units are not shown in FIGS. 1 and 3). Further, the structure of the 1/m-time generating circuit 38 newly employed according to the first embodiment of the present invention can be formed by hardware or software, and will be apparent by a person having skill in the art. Hence, an illustration of the internal structure of the 1/m-time generating circuit 38 will not be given.

A description will now be given of a second embodiment of the present invention.

Figure 10:
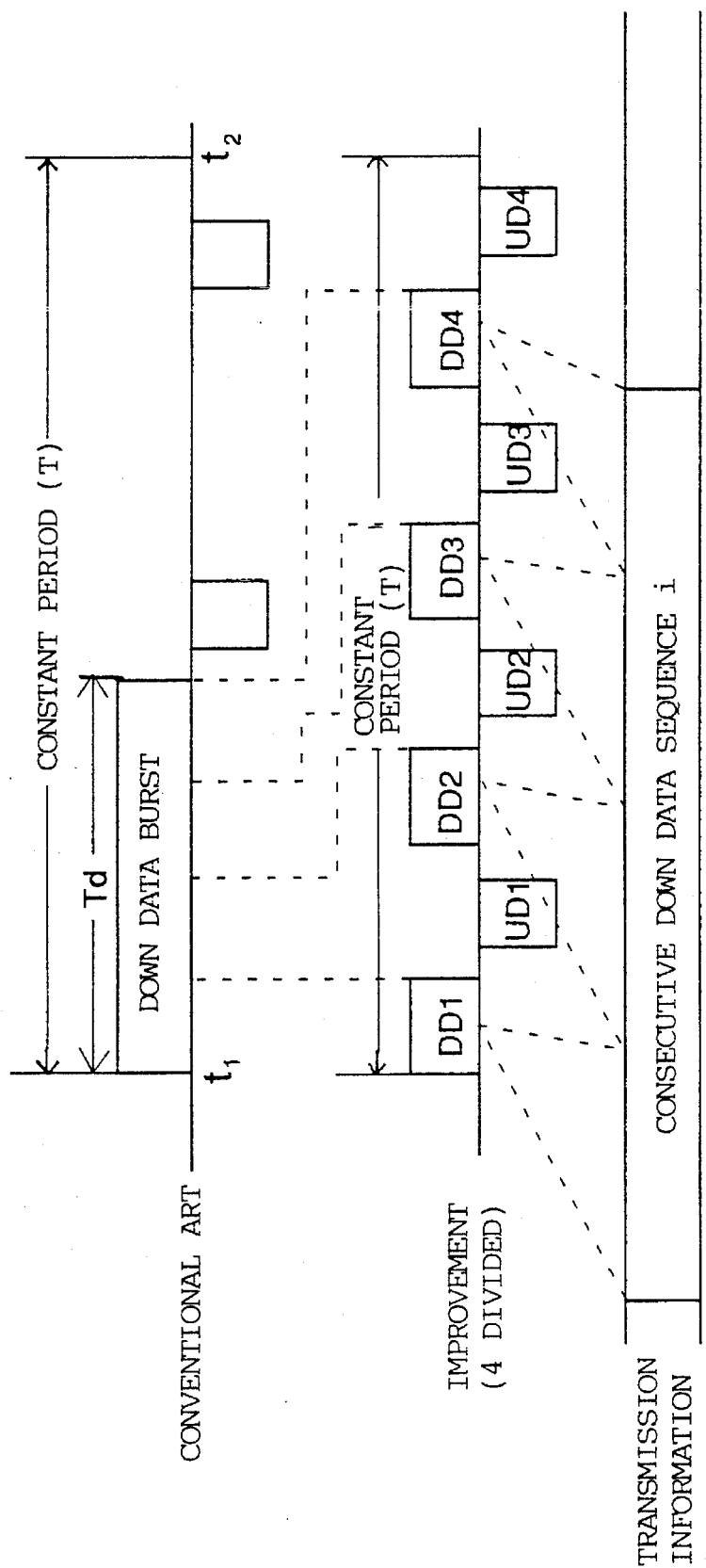
FIG. 10 is a timing chart showing the principle and the operation of a second embodiment of the present invention.

FIG. 10 is a timing chart of the second embodiment of the present invention in comparison with the conventional art. For the sake of convenience, a description will first be given of how a data burst equal to one frame is divided into data sub-bursts according to the second embodiment of the present invention, and then the block structure of the second embodiment thereof will be described.

More particularly, FIG. 10 shows a data transfer in the down direction (from the exchange office to the terminal equipment) in the burst transfer system realizing the 1:n transfer system as shown in FIG. 3. In the conventional art, the transmission information (consecutive down data sequence) shown in FIG. 10 is sent, as a data burst, to the transmission line in the period (starting from time $t_2$) next to the constant period T (starting from time $t_1$).

On the other hand, according to the second embodiment of the present invention, the down data burst transferred in the constant period T in the conventional art is divided into a plurality of data sub-bursts DD1 through DD4 (four sub-bursts in the example shown in FIG. 10) including the redundant information. Hence, each of the data sub-bursts has an identical amount of transmission information, as shown in FIG. 10. In this regard, the second embodiment of the present invention differs from the first embodiment thereof in which only the first data sub-burst has a less amount of transmission information than that of the other data sub-bursts. According to the second embodiment of the present invention, all the redundant information may be divided or some redundant information (for example, only the overhead information OH) may be divided.

As in the case of the first embodiment of the present invention, the up data bursts UD1 through UD4 are transferred in the period T as shown in FIG. 10. In the example shown in FIG. 10, each of the up data bursts is not divided into data sub-bursts. However, it is possible to divide each of the up data bursts into data sub-bursts in addition to the sub-burst formation for the down data bursts.

Figure 11A:
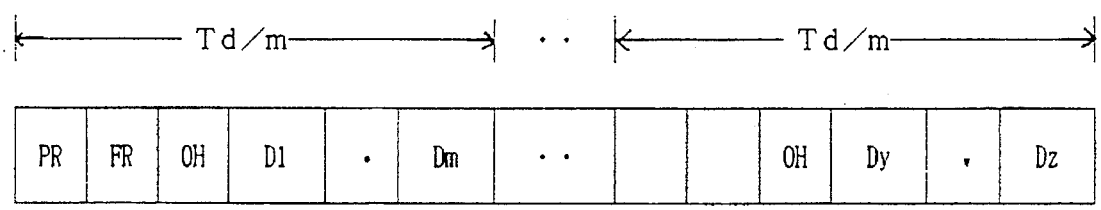
FIGS. 11A and 11B are diagrams of frame formats used in the second embodiment of the present invention.
Figure 11B:
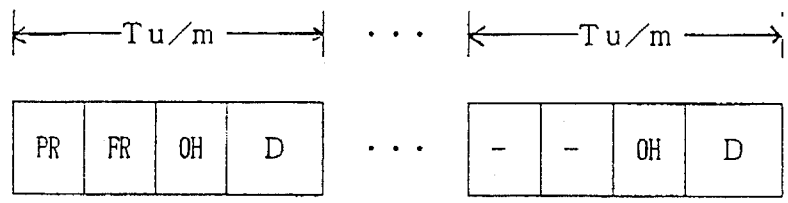

FIG. 11A shows a format of a down data burst equal to one frame according to the second embodiment of the present invention, and FIG. 11B shows a format of an up data burst equal to one frame according to the second embodiment thereof. As shown in FIG. 11A, the down data burst equal to one frame is divided into m data sub-bursts, each of which sub-bursts has a length equal to Td/m (Td is the data length of the down data burst in the constant period T). Each of the data sub-bursts is capable of handling an identical amount of redundant information and an identical amount of transmission information. In the case shown in FIG. 11A, only the first data sub-burst includes the redundant information, namely the preamble pattern PR, the framing pattern FR and the divided overhead information OH. In each of the other data sub-bursts, an identical amount of redundant information is transmittable but there is provided only the divided overhead information OH. On the receiving side, the preamble pattern PR and the framing pattern FR included in the first data sub-burst are detected and stored, and are used to generate the clock signal and timing information in order to receive the subsequent data sub-bursts.

In FIG. 11A, it is also possible to divide all the redundant information into m. In this case, each data sub-burst includes the divided preamble pattern PR, the divided framing pattern FR and the divided overhead information OH. The divided preamble pattern PR and the divided framing pattern FR are respectively inserted into two blank areas shown in FIG. 11A. Since each of the data sub-bursts has the divided preamble pattern PR and the framing pattern FR, it is possible to reproduce the clock signal etc. used to reproduce the received information every data sub-burst. However, since the redundant information included in each data sub-burst is divided redundant information, the precision in signal reproduction will be slightly degraded.

As shown in FIG. 11B, the up data burst is divided into m as in the case shown in FIG. 11A. When the data length of one up data burst is represented as Tu, one data sub-burst has a data length equal to Tu/m. In the case shown in FIG. 11B, only the first data sub-burst includes the redundant information, namely preamble pattern PR, the framing pattern FR and the divided overhead information OH. Each of the other data sub-burst includes, as redundant information, only the divided overhead information. It is possible to arrange the frame so that each data sub-burst includes the divided preamble pattern, the divided framing pattern FR and the divided overhead information OH.

Figure 12:
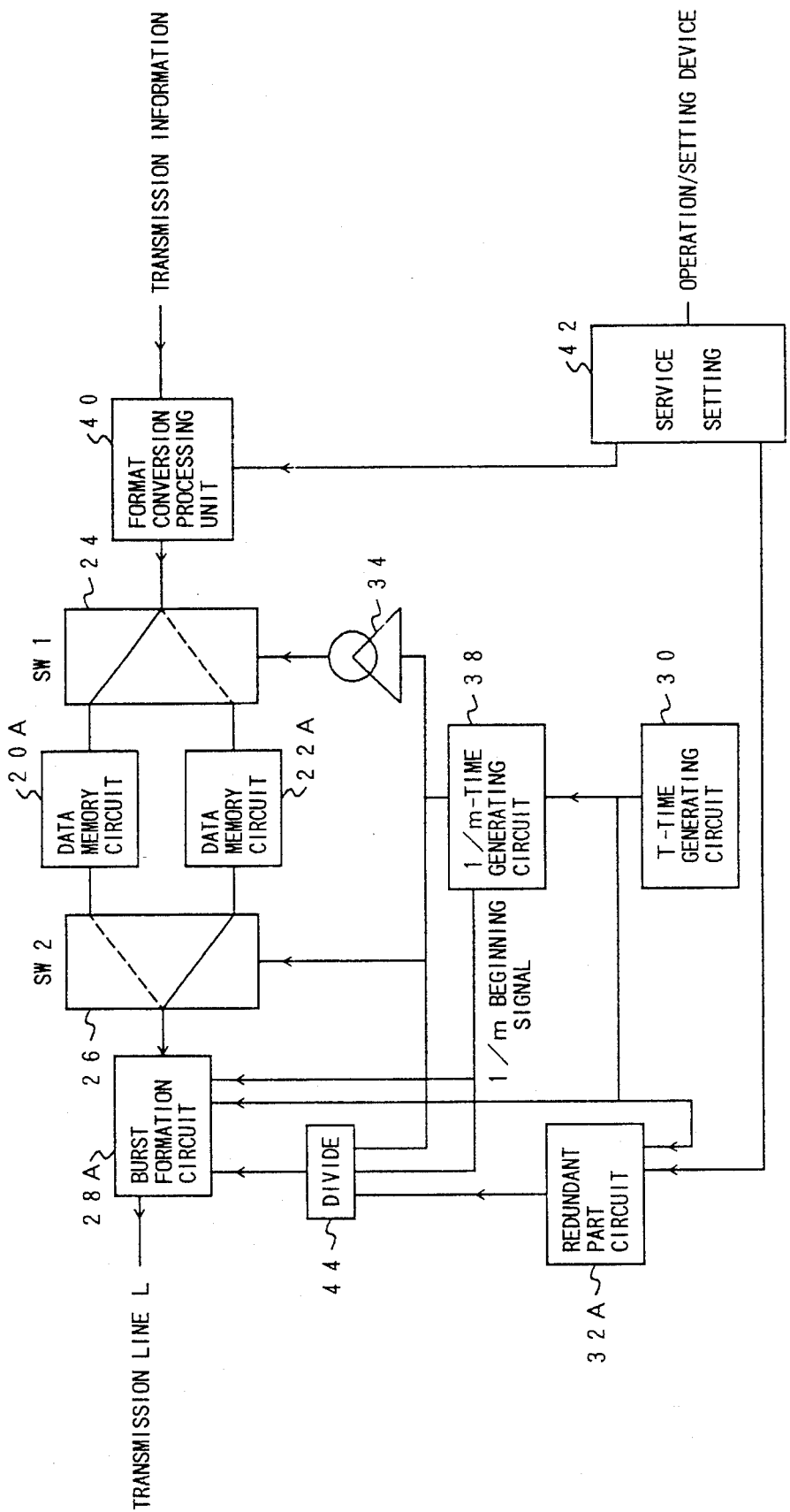
FIG. 12 is a block diagram of the structure of the second embodiment of the present invention.

FIG. 12 is a block diagram of the structure of the second embodiment of the present invention. More particularly, FIG. 12 shows the structure of a circuit configuration (burst circuit) related to the formation of burst data, the structure being provided in each transmission line L in each network termination equipment 10 and the in-office line termination equipment 14 shown in FIGS. 1 and 3. In FIG. 12, parts that are the same as those shown in FIG. 9 are given the same reference numbers. The burst circuit shown in FIG. 12 uses a redundant part circuit 32A instead of the redundant part circuit 32 shown in FIG. 9, and further includes a divider circuit 44. The redundant part circuit 32A receives the timing signal output by the T-time generating circuit 30 every period T in addition to the setting signal related to redundant information supplied from the service setting unit 42. The divider circuit 44 receives the 1/m beginning signal output by the 1/m-time generating circuit 38 at the beginning of each period T, the timing signal output by the T-time generating circuit 30 every period T, and the redundant information output by the redundant part circuit 32A, and outputs divided redundant information to the burst formation circuit 28A.

A description will now be given of the operation of the circuit shown in FIG. 12. In the operation described below, as shown in FIG. 11A, only the first data sub-burst includes the preamble pattern PR and the framing pattern FR, and each of the data sub-bursts includes, as redundant information, the divided overhead information OH.

The format conversion processing unit 40 receives transmission information and performs the format conversion process. Then the unit 40 outputs the format-converted transmission information to the switch 24. It will now be assumed that the switch 24 connects the format conversion processing unit 40 and the data memory circuit 20A together, and the switch 26 connects the burst formation circuit 28A and the data memory circuit 22A together. The transmission information from the format conversion processing unit 40 is written into the data memory circuit 20A via the switch 24. At this time, the previously written information is read from the data memory circuit 22A and is output to the burst formation circuit 28A.

It will now be assumed that the timing signal from the T-time generating circuit 30 and the 1/m beginning signal from the 1/m-time generating circuit 38 are simultaneously output at the time when the switch 26 is switched and the transmission information from the data memory circuit 22A is output to the burst formation circuit 28A. In this case, the redundant part circuit 32A outputs the redundant information to the divider circuit 44. The divider circuit 44 outputs, in response to the 1/m beginning signal from the 1/m-time generating circuit 38 and the timing signal output every period 1/m, the preamble pattern PR and the framing pattern FR in the received redundant information to the burst formation circuit 28A without any modification. Further, the divider circuit 44 outputs the first 1/m part of the overhead information OH to the burst formation circuit 28A. The burst formation circuit 28A sends the redundant information output from the redundant part circuit 32 to the transmission line L, and subsequently outputs the transmission information from the data memory circuit 22A to the transmission line L. In the case shown in FIG. 11A, after the PR, FR and OH are output, transmission information D1, D2, . . . , Dn are output to the transmission line L. During the above operation, transmission information subsequent to Dn shown in FIG. 8A is written into the data memory circuit 20A.

After the time T/m elapses, the 1/m-time generating circuit 38 outputs the timing signal, and the switches 24 and 26 are switched. Thereby, the transmission information form the format conversion processing unit 40 is written into the data memory 22A via the switch 24, and the transmission information written into the data memory circuit 20A is read therefrom and is output to the burst formation circuit 28A via the switch 26. In the case shown in FIG. 11A, the divider circuit 44 outputs the next 1/m divided overhead information OH to the burst formation circuit 28A in synchronism with the next timing signal from the 1/m-time generating circuit 38. The burst formation circuit 28A outputs the received divided overhead information OH to the transmission line L, and then outputs the transmission information from the data memory circuit 28A to the transmission line L.

In the above-mentioned manner, the m data sub-bursts per frame shown in FIG. 11A are produced and output to the transmission line L. When the time T elapses, the T-time generating circuit 30 outputs the timing signal, and simultaneously the 1/m-time generating circuit 38 outputs the 1/m beginning signal. Then, the circuit operates in the same way as described above.

In the case where the divided preamble pattern PR, framing pattern FR and overhead information OH is included in each of the data sub-bursts, the divider circuit 44 outputs the above divided redundant information to the burst formation circuit 28A in response to the timing signal output by the 1/m-time generating circuit 38 every 1/m period.

A description will now be given of a third embodiment of the present invention.

Figure 13:
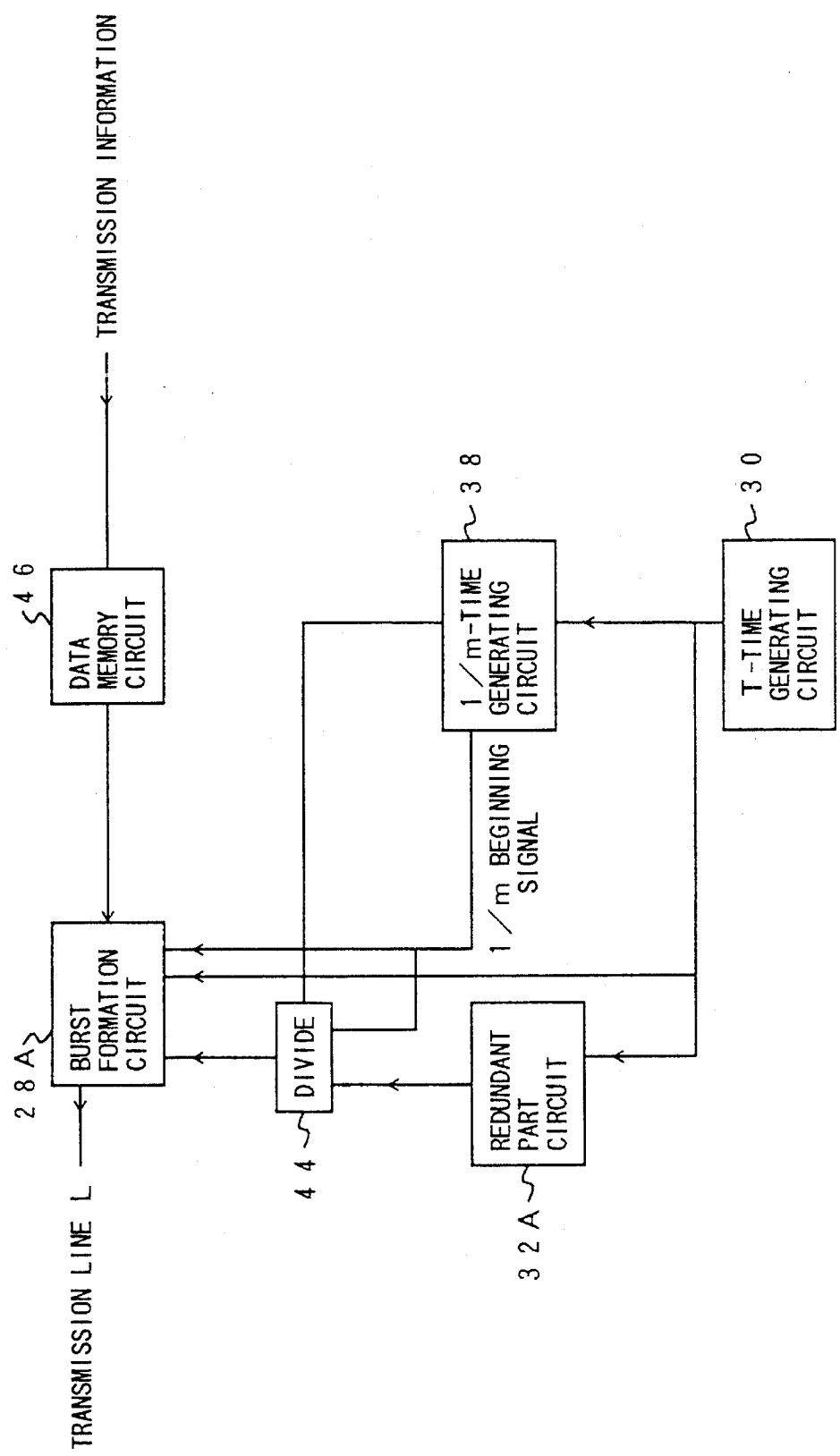
FIG. 13 is a block diagram of the structure of a third embodiment of the present invention.

FIG. 13 is a block diagram of the structure of the third embodiment of the present invention. In FIG. 13, parts that are the same as those shown in the previously described figures are given the same reference numbers. The third embodiment of the present invention differs from the first and second embodiments thereof in that the third embodiment utilizes a single data memory circuit 46 formed with a dual-port memory or the like. With the above structure, the third embodiment of the present invention does not need the switches 24 and 26, and is simplified.

Figure 14:
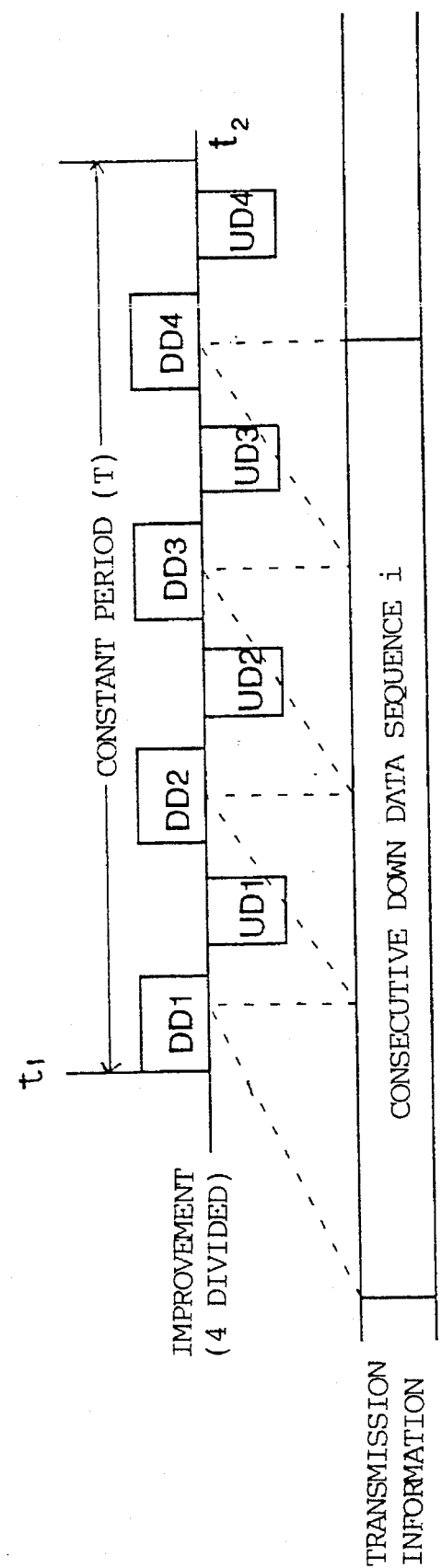
FIG. 14 is a timing chart of the operation of the third embodiment of the present invention.

FIG. 14 shows a data transfer in the down direction (from the exchange office to the terminal equipment) in the burst transfer system realizing the 1:n transfer as shown in FIG. 3. According to the third embodiment of the present invention, a down data burst transferred in the constant period T in the conventional art is divided into a plurality of data sub-bursts DD1–DD4 including redundant information, and these sub-bursts DD1–DD4 are transferred in the same period. Hence, as shown in FIG. 14, each of the data sub-bursts DD1–DD4 has an identical amount of transmission information. In this regard, the third embodiment of the present invention differs from the first embodiment thereof in which only the first data sub-burst has a less amount of transmission information than that of the other data sub-bursts. According to the third embodiment of the present invention, all the redundant information may be divided as in the case of the second embodiment thereof, or only some redundant information (for example, only the overhead information OH) may be divided.

Figure 15:
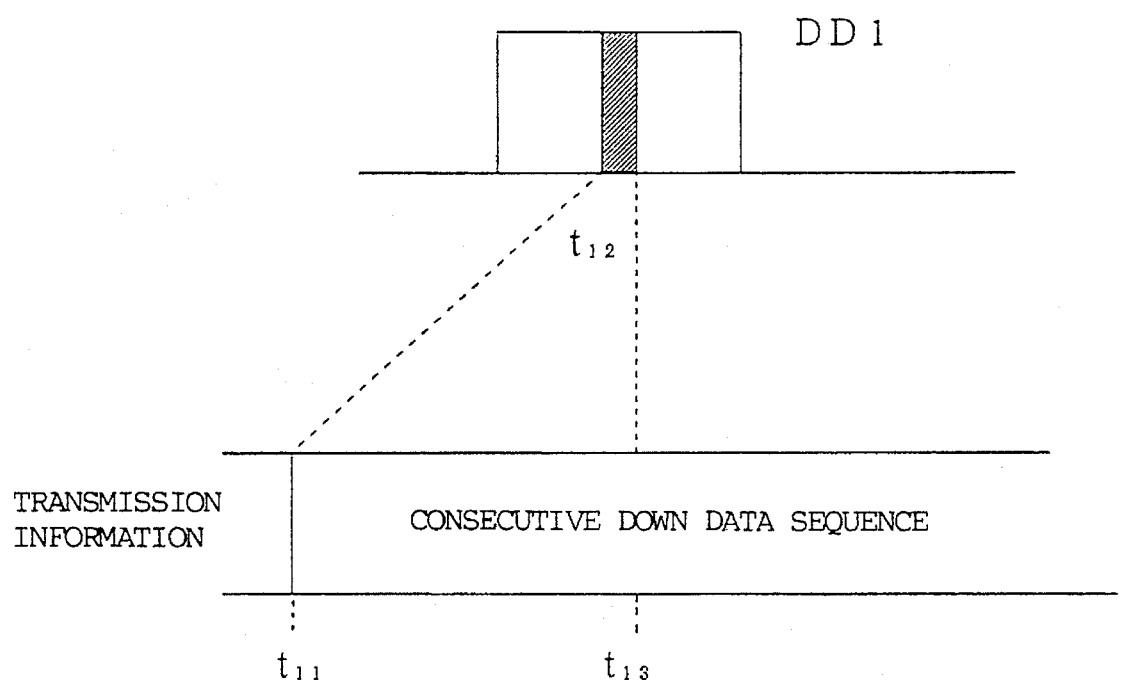
FIG. 15 is an enlarged timing chart of a part of the signal shown in FIG. 14.

The write/read operation of the data memory circuit 46 is performed so that writing and reading of transmission information are simultaneously completed. FIG. 15 is an enlarged view of the data sub-burst DD1 shown in FIG. 14. The consecutive down data sequence which is transmission information is written into the data memory circuit 46 at time $t_{11}$. When the reading speed of the data memory circuit 46 is set to be faster than the writing speed thereof, after the writing of the transmission information is started, the reading operation is started at a certain timing (time $t_{12}$ in the case shown in FIG. 15). At time $t_{13}$, the writing and reading operation are simultaneously completed.

Figure 16:
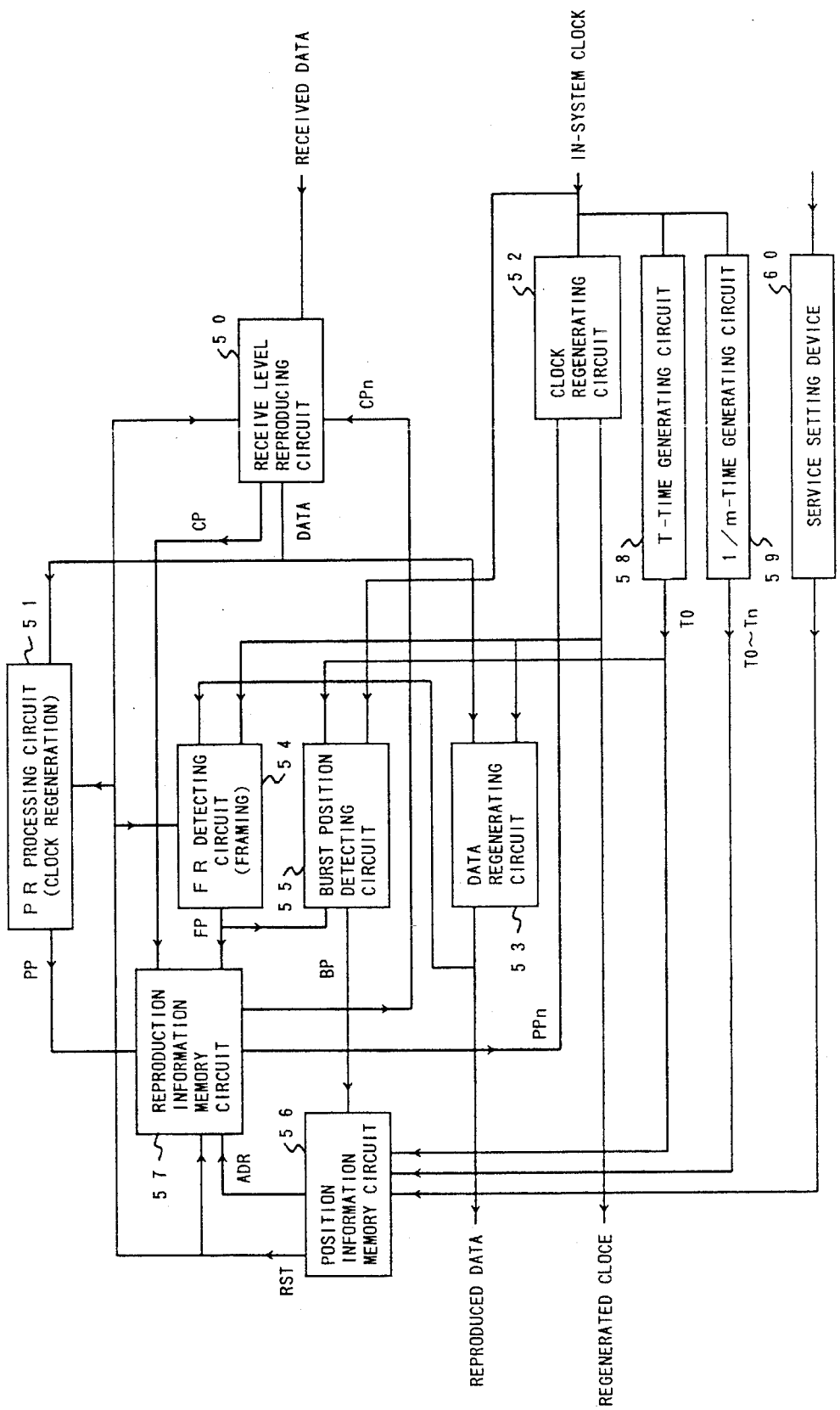
FIG. 16 is a block diagram of the structure of a fourth embodiment of the present invention.

A description will now be given of a fourth embodiment of the present invention. FIG. 16 shows a receiving system provided in each transmission line L in each network termination equipment 10 and the in-office line termination unit 14 in the burst transfer system shown in FIG. 1 or FIG. 3. In the aforementioned first embodiment of the present invention, only the first data sub-burst includes the preamble pattern PR and the framing pattern FR, and the subsequent data sub-bursts include only transmission information. Hence, the first embodiment of the present invention needs timing regeneration for receiving and reproducing the data sub-bursts including only transmission information. The receiving system according to the fourth embodiment of the present invention receives and reproduces the data sub-bursts which do not have the preamble pattern PR and the framing pattern FR.

FIG. 16 is a block diagram of the structure of the fourth embodiment of the present invention. The receiving system shown in FIG. 16 includes a receive level control (reproduction) circuit 50, a PR (preamble pattern) processing circuit 51, a clock regenerating circuit 52, a data producing circuit 53, an FR (framing pattern) detecting circuit 54, a burst detection circuit 55, a position information memory circuit 56, a reproduction information memory circuit 57, a T-time generating circuit 58, a 1/m-time generating circuit 59 and a service setting unit 60. In-system clock signals generated in the system are output to the structural parts as shown in FIG. 16.

The frame synchronization is established by the data sub-burst having the framing pattern FR, and synchronizing is not performed for the other data sub-bursts. The data level and the clock phase obtained when the frame synchronization is established by the first data sub-burst are stored. The other data sub-bursts are processed by means of the stored data level and the clock phase. Hence, it becomes possible to increase the speed of the burst receive process and to reduce the intervals between the adjacent data sub-bursts and increase the amount of transmittable information.

The receiving system according to the fourth embodiment of the present invention will now be described in more detail.

The receive level control circuit 50 automatically controls the gain of a built-in amplifier circuit in order to make the data sub-bursts have an identical receive level. In the automatic control, a reset signal RST which will be described later is received at a virtual beginning position of each data sub-burst, so that the circuit 50 is initialized. Then, the automatic gain control is activated, and a control value obtained at this time is output to the reproduction information memory circuit 57 as a signal GP. In a case where a specification is given by a signal GPn which will be described later, the gain of the amplifier circuit corresponding to the signal GPn is selected.

The PR processing circuit 51 automatically selects the phase enabling normal receipt of each data sub-bursts which may have different phases. In this selecting process, after initializing by the reset signal RST, a changing point in the received data is detected and the clock signal having the optimal phase is selected. The selected value obtained at this time is output, as signal PP, to the reproduction information memory circuit 57.

The clock reproduction circuit 52 produces multiple phases of the clock signal, and outputs the clock signal having the phase selected by the selected value of the signal PPn. The data reproduction circuit 53 performs retiming operation on the output data from the receive level control circuit 50 by the clock signal selected by the clock reproduction circuit 52.

The FR detecting circuit 54 detects the framing pattern FR in the data sub-burst from the retimed data, and confirms that the received data is normal burst data. The confirmation result is output, as signal FP, to the reproduction information memory circuit 57 and the burst position detecting circuit 55.

The burst position detecting circuit 55 receives the signal FP and counts a delay from time T0 from the T-time generating circuit 58 to indicate the receive burst position, so that burst position information T1 through Tn is output. The result of detecting the burst positions is output, as signal BP, to the position information memory circuit 56.

The position information memory circuit 56 generates the reset signal RST and an address signal ADR from the timing information from the T-time generating circuit 58 and the 1/m-time generating circuit 59 by referring to the number of sub-bursts, the length thereof and the interval thereof input by the service setting unit 60.

The signal BP is stored in the reproduction information memory circuit 57 in the case where the signal FR is received at the time T0. The reset signal RST initializes the structural parts in order to newly perform the clock regeneration and receive level reproduction when the received data sub-burst includes the preamble pattern PR and the framing pattern FR at the beginning thereof. The address signal ADR supplies the stored address for each received data sub-burst to the reproduction information memory circuit 57 which stores information necessary to reproduce each data sub-burst every 1/m period.

The reproduction information memory circuit 57 receives the reset signal RST, and the signals PP and GP in a memory area indicated by the address signal ADR. When the circuit 57 does not receive the reset signal, it outputs the signals PPn and BPn stored in the memory area indicated by the address signal ADR. The signals PP and GP are stored in the reproduction information memory circuit 57 when the signal FP is received.

Figure 17A:
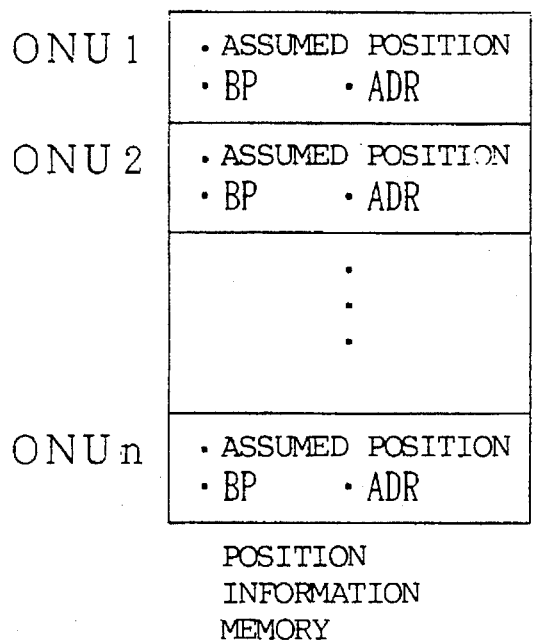
FIGS. 17A and 17B are diagrams of examples of the contents of a position information memory circuit and a reproduction information memory circuit shown in FIG. 16.
Figure 17B:
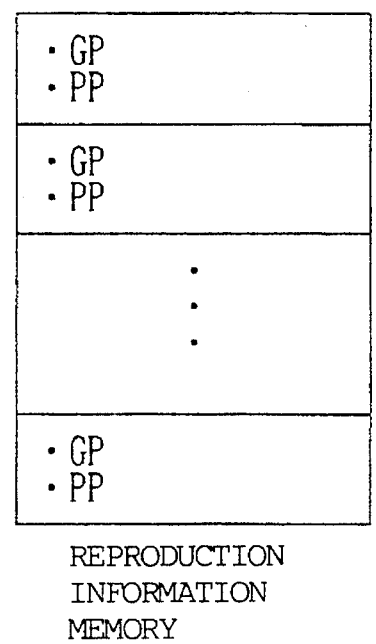

FIG. 17A shows an example of the content of the position information memory circuit 56 and an example of the content of the reproduction information memory circuit 57. The position information memory circuit 56 stores an assumed position, the signal BP and the address signal ADR for each of the terminal equipments ONU1–ONUn. The reproduction information memory circuit 57 stores the signals GP and PP for each of the terminal equipments ONU1–ONUn.

Figure 18:
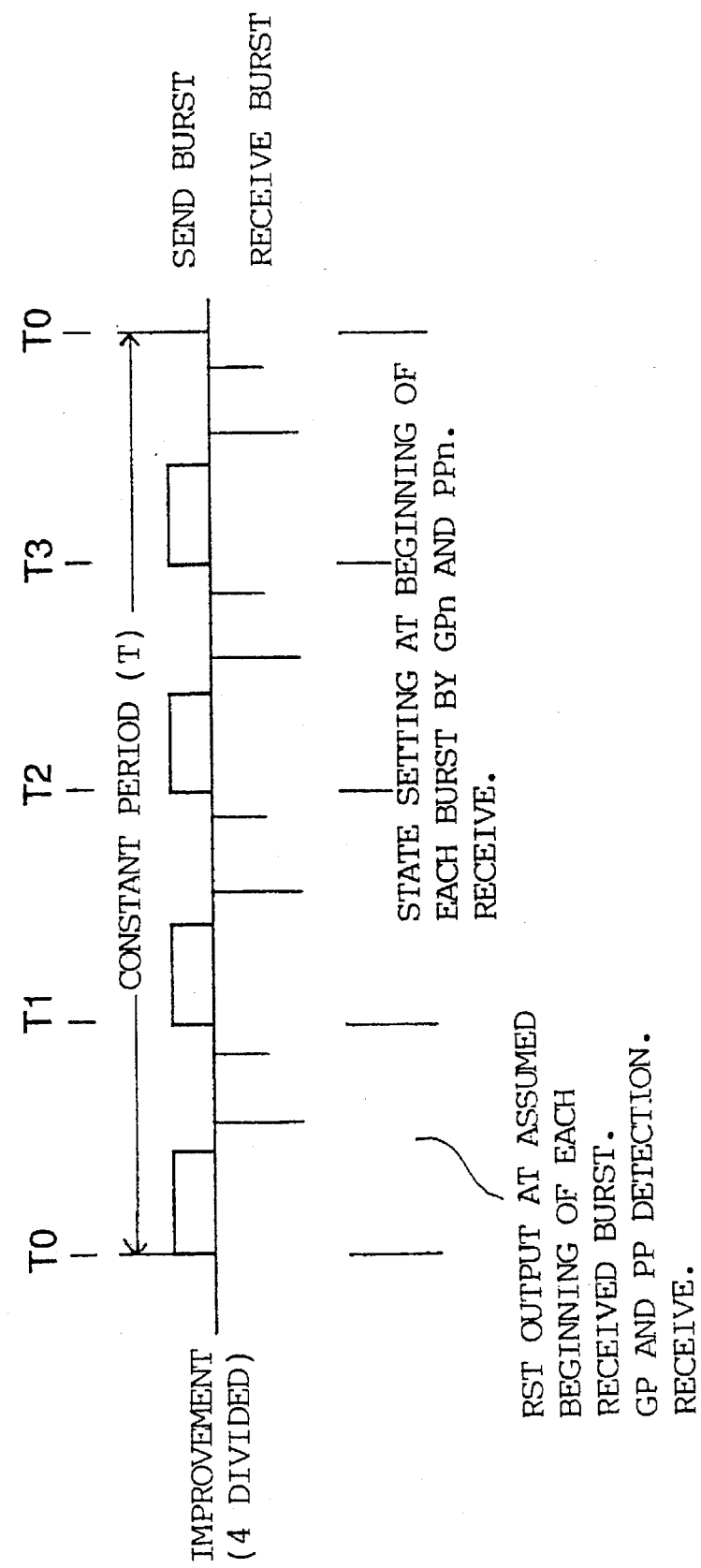
FIG. 18 is a timing chart of the operation of the fourth embodiment of the present invention.

FIG. 18 is a timing chart of the operation of the fourth embodiment of the present invention. The reset signal RST is output with respect to the assumed beginning receive data sub-burst, and the signal GP indicating the control value of the gain and the signal indicating the optimal phase clock are output to the reproduction information memory circuit 57. The reproduction information memory circuit 57 outputs the signals GPn and PPn at the beginning of each received data sub-burst, and the data sub-bursts having the redundant information PP and FR are received and reproduced.

The above-mentioned receiving system is capable of receiving burst signals of the formats shown in FIGS. 8A and 8B and burst signals of the formats shown in FIGS. 11A and 11B. The above-mentioned receiving system is effective particularly to the receiving of up data sub-bursts. That is, even if items of data from subscriber terminals have different receive levels and different clock phases, the reproduction of transmission information can be continuously performed by means of the redundant information detected at the beginning. Hence, it is possible to reduce the intervals between the data sub-bursts and the intervals between the up data bursts and to prevent reduction in the information transmission efficiency.

According to the present invention, a data burst of one frame is divided into m (m is an integer), and m data sub-bursts thus produced are output to the transmission line. As a result, a delay occurring in the burst forming process can be reduced and a delay in information transmission can be reduced.

The present invention is not limited to the specifically disclosed embodiments, and variations and modifications may be made without departing from the scope of the present invention.

What is claimed is:

1. A burst transfer device connected to a transmission line, for sending data as a data burst of a frame structure including transmission information and redundant information to the transmission line, said burst transfer device comprising:

memory means for temporarily storing transmission information;

redundant information adding means for adding redundant information to the transmission information; and control means for receiving the transmission information from the memory means and the redundant information from the redundant information adding means to obtain a data burst having said frame structure and for producing m data sub-bursts by dividing said data burst having said frame structure into m portions, m being an integer, said m data sub-bursts being output to the transmission line.

2. The burst transfer device as claimed in claim 1, wherein said control means comprises means for receiving the transmission information from the memory means and the redundant information from the redundant information adding means and for producing said m data sub-bursts by dividing the data burst having said frame structure into m equal portions.

3. The burst transfer device as claimed in claim 1, wherein only a beginning one of the m data sub-bursts includes the redundant information.

4. The burst transfer device as claimed in claim 3, further comprising:

synchronizing means for extracting framing information from the redundant information included in said beginning one of the m data sub-bursts and for storing extracted framing information; and receiving means for detecting sub-burst positions of remaining (m-1) data sub-bursts on the basis of a timing related to the extracted framing information and receiving the (m-1) data sub-bursts by referring to the (m-1) sub-burst positions.

5. The burst transfer device as claimed in claim 1, wherein said control means comprises means for receiving the transmission information from the memory means and the redundant information from the redundant information adding means and for producing m data sub-bursts so that each of the m data sub-bursts includes divided transmission information obtained by dividing the redundant information into m portions and divided redundant information obtained by dividing the transmission information into m portions.

6. The burst transfer device as claimed in claim 1, wherein said control means comprise means for receiving the transmission information from the memory means and the redundant information from the redundant information adding means and for producing said m data sub-bursts so that each of the m data sub-bursts includes divided transmission information obtained by dividing a part of the redundant information into m portions and divided redundant information obtained by dividing the transmission information into m portions.

7. The burst transfer device as claimed in claim 6, wherein a beginning one of the m data sub-bursts includes one of the m portions of the divided redundant information obtained by dividing the part of the redundant information into m portions and a remaining part of the redundant information which is not divided.

8. The burst transfer device as claimed in claim 1, further comprising:

synchronizing means for extracting framing information from the redundant information included at least in one of the m data sub-bursts transferred from a remote terminal via the transmission line and for storing extracted framing information; and receiving means for detecting sub-burst positions of the m data sub-bursts on the basis of a timing related to the extracted framing information and receiving the m data sub-bursts by referring to the sub-burst positions.

9. The burst transfer device as claimed in claim 1, wherein said memory means comprises:

first and second memories; and switch means for controlling the first and second memories so that write and read operations on the first and second memories are alternately carried out every 1/m period in such a way that the transmission information is written into one of the first and second memories while the transmission information is read from the other one of the first and second memories.

10. The burst transfer device as claimed in claim 1, wherein said memory means comprises a single memory which operates write and read timings such that writing and reading of the transmission information are simultaneously completed.

11. A burst transfer system comprising:

an exchange office;

a plurality of terminals;

first termination equipments provided in transmission lines connected to the plurality of terminals; and a second termination equipment provided in the exchange office and connected to the plurality of terminals, a data burst of a frame structure including transmission information and redundant information being transferred in the burst transfer system, each of said first and second termination equipments comprising:

memory means for temporarily storing transmission information;

redundant information adding means for adding redundant information to the transmission information; and control means for receiving the transmission information from the memory means and the redundant information from the redundant information adding means to obtain a data burst having said frame structure and for producing m data sub-bursts by dividing said data burst having said frame structure into m portions, m being an integer, said m data sub-bursts being output to a transmission line.

12. The data transfer system as claimed in claim 11, further comprising:

synchronizing means for extracting framing information from the redundant information included in at least one of the m data sub-bursts transferred from a remote terminal via at least one of the transmission lines; and receiving means for detecting sub-burst positions of the m data sub-bursts on the basis of a timing related to the extracted framing information and receiving the m data sub-bursts by referring to the m sub-burst positions.

* * * * *